United States Patent [19]

Mozer

[11] Patent Number: 4,895,407
[45] Date of Patent: Jan. 23, 1990

[54] TREE LIMB HOOKER

[76] Inventor: Daniel S. Mozer, 126 Grandview Ave., Yardville Heights, N.J. 08620

[21] Appl. No.: 237,359

[22] Filed: Aug. 29, 1988

[51] Int. Cl.$^4$ ................................................ B25J 1/04
[52] U.S. Cl. ..................................................... 294/19.1
[58] Field of Search .................. 294/19.1, 24; 47/1 R; 114/221 R, 230

[56] References Cited

U.S. PATENT DOCUMENTS

| | | |
|---|---|---|
| Re. 20,737 | 5/1938 | Kehl . |
| 1,681,990 | 8/1928 | Lewis . |
| 2,084,617 | 6/1937 | Kehl . |
| 2,096,244 | 10/1937 | Heinrich . |
| 2,109,377 | 2/1938 | Airington . |
| 2,542,665 | 2/1951 | Gustafson . |
| 2,667,375 | 1/1954 | Cardinal . |
| 2,700,252 | 1/1955 | Paganelli . |
| 2,776,162 | 1/1957 | Bitz et al. . |
| 2,811,127 | 10/1957 | Palsson . |
| 3,072,428 | 1/1963 | Johnson . |
| 3,072,429 | 1/1963 | Stipan . |
| 3,774,953 | 11/1973 | Babcock . |
| 3,918,385 | 11/1975 | Wallace . |
| 4,557,214 | 12/1985 | Molitor . |

FOREIGN PATENT DOCUMENTS

| | | | |
|---|---|---|---|
| 854802 | 8/1981 | U.S.S.R. | ................... 114/230 |
| 250367 | 4/1926 | United Kingdom | ........ 114/230 |

Primary Examiner—Margaret A. Focarino
Assistant Examiner—Dean J. Kramer
Attorney, Agent, or Firm—Sperry, Zoda & Kane

[57] ABSTRACT

A device for attaching a rope to a tree limb, from a remote location includes a handle having on one end a curved arm terminating in a U-shaped rope retainer element, and having on its other end a hook or finger member in association with a retainer lug. A rope having a guide loop is draped over the retainer, after which the device is rotated about a tree limb and disengaged from the rope, leaving the looped end of the rope hanging over the limb. The finger is then passed through the loop, permitting the rope to be pulled downwardly to a position in which the other end of the rope can be passed through the loop. The rope can then be pulled tightly around the limb.

11 Claims, 2 Drawing Sheets

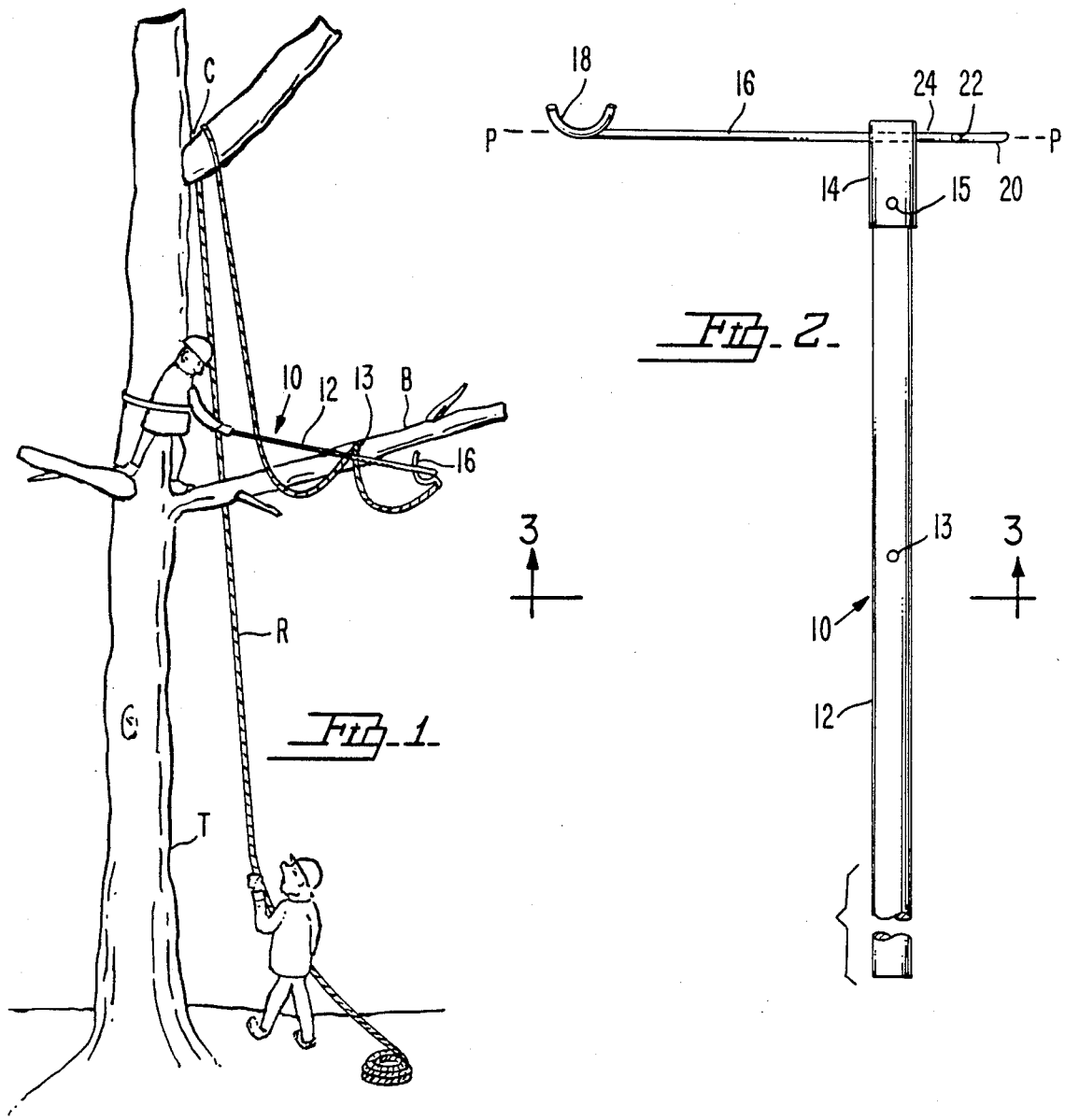

TREE LIMB HOOKER

BACKGROUND OF THE INVENTION

1. Field of the Invention

The present invention relates generally to the art of tree service, including tree surgery, topping, trimming, removal, and the like. In a more particular sense, the invention relates to a tool usable by those engaged in this field, for the purpose of positioning a rope over a branch, and thereafter facilitating the tieing of the rope to the branch for any of various purposes.

2. Description of the Prior Art

Heretofore, it has been proposed to provide tools to facilitate attachment of a rope to a tree limb. However, so far as is known no tool has heretofore been devised that permits this operation to be carried out by a worker positioned in the tree, in a way that allows the worker to extend the tool laterally along the length of a branch, swing a rope over the branch, pull a loop on the end of the rope toward himself, and thereafter draw the rope tightly around the branch. Devices heretofore conceived have in general required that one be positioned directly beneath the tree limb which in some instances is a dangerous location, and in any event detracts measurably from the versatility of the tool.

The present invention has as its main purpose the provision of a tool that though very inexpensively constructed, is nevertheless particularly well designed to be used by a workman in the tree itself, to hook a rope around a branch outwardly from the trunk of the tree without unnecessary risk of personal injury.

SUMMARY OF THE INVENTION

Summarized briefly, the invention comprises an elongated handle, which can if desired be telescopically constructed so as to be adjustable in length. On an end of the handle, there is provided an arm that lies wholly in a plane normal to the length of the handle, and is curved through substantially 180 degrees. On the distal end of the arm, there is provided a yoke or U-shaped retainer element. Projecting laterally from the handle in the same plane as the arm, but in the opposite direction, is an extension terminating in an inclined finger at the proximal end of which there is a lug.

In use, a closed loop is made on an end of a rope, and the rope is draped over the lug and over the retainer element, hanging loosely along the length of the curved arm. The arm is positioned below a branch, and is then rotated through approximately 180 degrees. The looped end of the rope is carried by the arm over the top of the branch, as the arm travels around the branch circumference. The device is disengaged, after which the finger is inserted through the loop, the loop is pulled toward the user, and the other end of the rope is passed through the loop. The rope can then be pulled tight about the branch, for whatever purpose is dictated by the needs of the user.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

FIG. 1 is a pictorial view showing a workman about to initiate use of the tool for attaching a rope to a tree branch;

FIG. 2 is a top plan view of the device, the scale being enlarged above that of FIG. 1, a portion of the handle being broken away;

FIG. 3 is a transverse sectional view through the device taken substantially on line 3—3 of FIG. 2, on the same scale as FIG. 2;

FIG. 4 is a sectional view through the arm of the device, on line 4—4 of FIG. 3;

FIG. 5 is a side elevational view of the device as seen from line 5—5 of FIG. 3, a portion of the handle being broken away.

DETAILED DESCRIPTION OF THE PREFERRED EMBODIMENT

Figure 6:
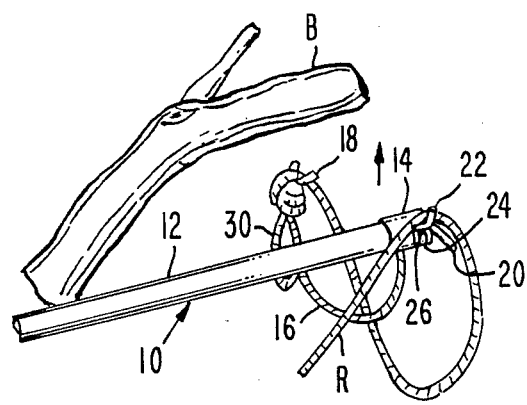
FIGS. 6–12 are pictorial representations showing the successive steps taken in attaching a rope to a tree branch.

The reference numeral 10 has been applied generally to the device comprising the present invention. In the illustrated embodiment a rigid, elongated, one-piece handle 12 is disclosed, having intermediate its ends a pin 13. It will be understood, however, that the handle could be adjustable in length, that is, it could be telescopic, or could be adapted to receive extensions, etc. All of these are well known expedients in adjusting the length of a handle, and accordingly, are not thought to require special illustration. It is mainly important to note that the tool does include a handle which is sufficiently long to permit its use by a worker positioned in a tree T (see FIG. 1) for attaching a rope R to a tree branch B well outwardly from the tree trunk or other relatively safe location.

It is important, in tree service, to permit a rope to be attached to a branch outwardly from a tree trunk, for any of various purposes. For example, if the branch is to be cut off at its base, the rope may be used by workers on the ground to aid in lowering the branch after it is sawed off, thus eliminating the possibility of the branch crashing into a house, or pulling down power lines or the like. For the purposes of the present disclosure, it is mainly important to note that in tree service it does become necessary, quite frequently, to attach a rope to a branch well outwardly from the trunk of the tree, at a location that would be hazardous to the worker were he to climb out upon and have his weight supported entirely upon the branch.

Fitted over an end of the handle 12 is a metal sleeve or ferrule 14, which is pinned at 15 to the handle or otherwise permanently and fixedly secured thereto. The ferrule serves as a mount for an arm 16 formed from a length of stout rod material. Arm 16 (see FIG. 3) is curved through approximately 180 degrees, describing an upwardly opening recess shaped as the lower half of a circle, the arm lying wholly (see FIG. 2) in a plane normal to the length of the handle 12.

At its distal end, the arm is provided with an upwardly opening, generally U-shaped yoke or retainer element 18. Element 18 provides, thus, an upwardly opening notch of U-shape for receiving a rope R. Referring to FIGS. 2 and 4, the retainer element 18 is inclined forwardly from the handle, out of the plane P—P in which the arm 16 lies.

Also lying in plane P—P but projecting laterally from the handle in the direction opposite from that in which the arm extends, is a finger 20, inclined downwardly within plane P—P and having at its proximal end an upwardly projecting, short lug 22. Finger 20 and lug 22 are on the outer end of an extension 24 extending laterally from the sleeve 14 in plane P—P, the extension 24 merging into a connecting member 26 curved through approximately 180 degrees about sleeve 14 and rigidly secured to the sleeve, as by means of welds 28.

It may be noted that the finger 20, extension 24, connecting member 26, and arm 16 could all be made from a single length of rod material, bent to the shape shown in FIG. 3. Yoke 18 and lug 22 can be separately formed, in a typical embodiment, but it should be noted at this point that the manner of manufacture of the device is not critical to the invention.

FIGS. 1 and 6–12 show how the device is used. Referring to FIG. 1, rope R is passed over a crotch C above a branch B that is to be cut off. One end of the rope is held by one worker. A second worker, in a typical situation, might be safely held against the trunk of the tree by a protective sling. Formed upon the other end of the rope is a loop 30 (shown clearly in FIGS. 6–12). Referring to FIG. 6, the rope may be passed over pin 13, after which the loop 30 is positioned over the retainer 18, the rope being then loosely draped so as to hang below the curved arm 16, and thereafter hung, away from the loop 30, over the rod extension 24. Lug 22 is close to the sleeve 14, and cooperates with the sleeve in holding the length of rope over the extension 24.

Figure 7:
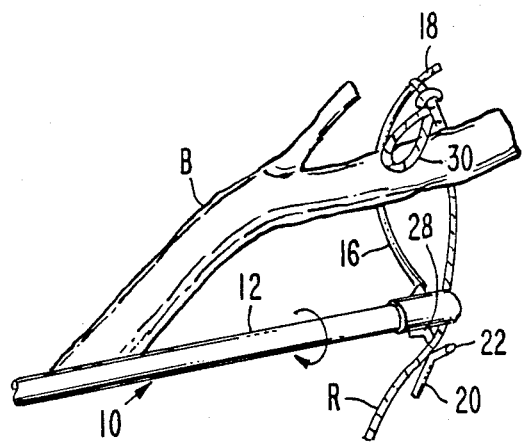

With the rope supported by the device in this way, the worker in the tree now positions the handle underneath the branch B as in FIG. 6. Then, referring to FIG. 7, the worker moves the handle upwardly close to the underside of the branch, and thereafter rotates the handle through a half-turn, that is to say, through 180 degrees, clockwise in FIG. 7. This causes the arm 16 to travel in a clockwise direction around the branch B as shown in FIG. 7, carrying the loop 30 with it upwardly along a side of the branch, and then over the top of the branch as the rotation of handle 12 continues.

Figure 8:
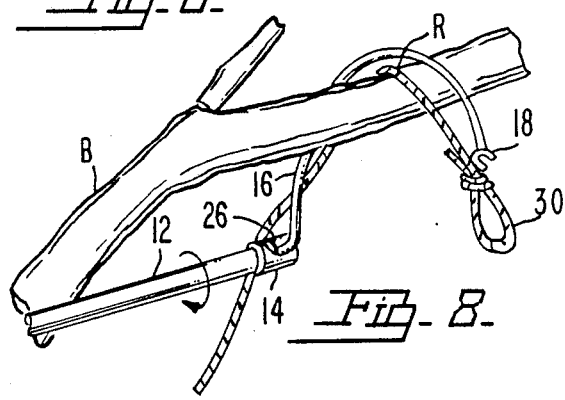

In FIG. 8, one observes that as the rotation of the handle 12 continues and the arm 16 continues to travel around the branch B, ultimately the curved recess defined by the arm 16, and the curved notch defined by the yoke or retainer element 18 both point downwardly, so that the loop 30 falls out of the yoke. Rope R will now have been positioned over the branch B.

Figure 9:
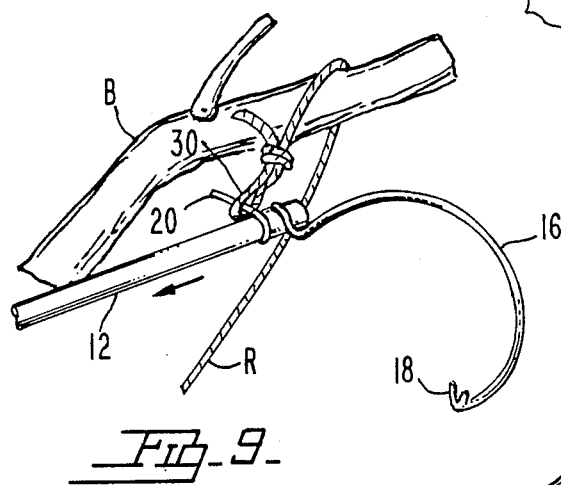

The disengagement of the rope from the arm 16 and retainer element 18 frees the device, so that as shown in FIG. 9, the worker now manipulates the handle to extend finger 20 through the loop 30. Now the worker pulls the handle toward him, as shown by the directional arrow in FIG. 9.

Figure 10:
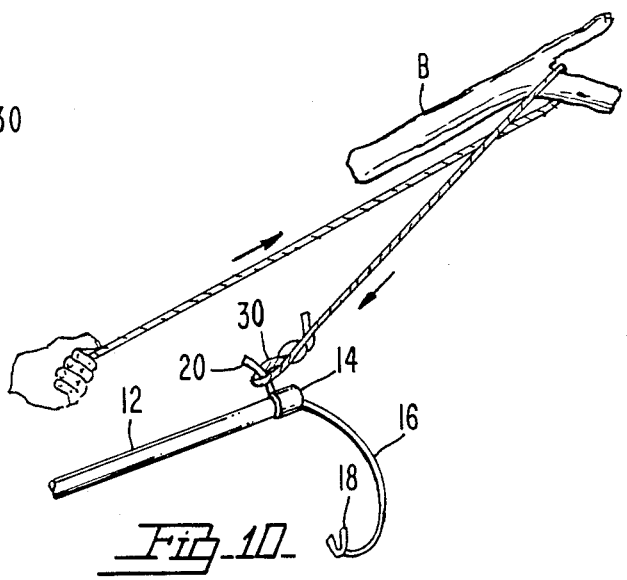
Figure 11:
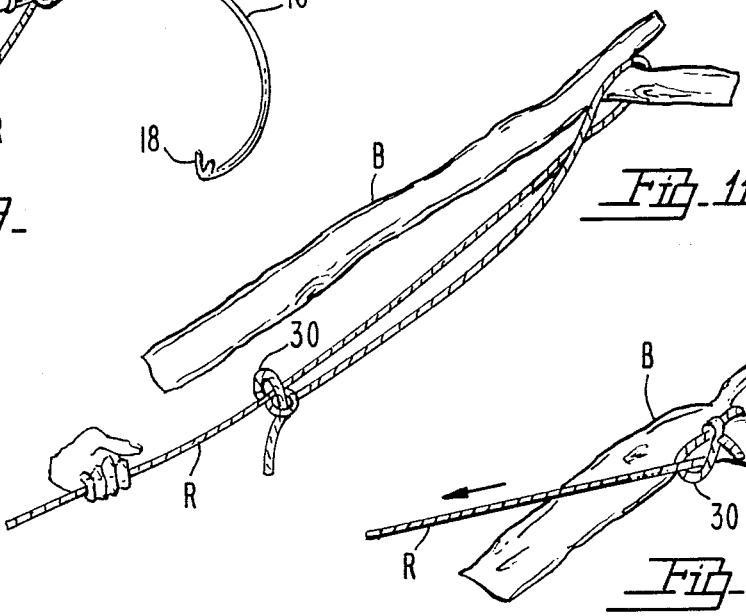
Figure 12:
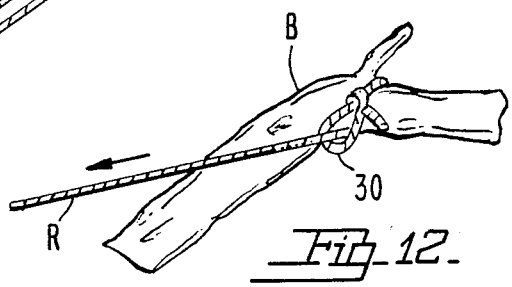

In FIG. 10, it is shown how the handle 12 has been used to pull the loop 30 to a location where it can be grasped by the worker. The worker, holding the other end of the rope, can now pass the rope through the loop 30 as shown in FIG. 11. Then, as shown in FIG. 12, pulling upon the other end of the rope causes the loop 30 to travel up the rope until it tightens the rope around the branch B. The rope is now connected to the branch. Thereafter, with the rope still extending over crotch C, the branch B can be sawed off. On the ground, the rope is held by the first worker, who carefully lowers the branch after it is sawed off. Or, as indicated above, the rope can be used for any other purpose dictated by the needs of the particular work situation.

While particular embodiments of this invention have been shown in the drawings and described above, it will be apparent, that many changes may be made in the form, arrangement and positioning of the various elements of the combination. In consideration thereof it should be understood that preferred embodiments of this invention disclosed herein are intended to be illustrative only and not intended to limit the scope of the invention.

I claim:

1. A device for attaching to the limb of a tree a rope having a loop at one end, comprising:
    (a) an elongated handle;
    (b) an arm extending laterally outwardly from said handle and having a recess disposed laterally outwardly from the handle, said recess opening upwardly whereby to travel around the side and over the top of said limb to thereafter open downwardly responsive to a half-turn of the handle about its longitudinal axis;
    (c) means on said arm having a notch opening upwardly for supporting the looped end of the rope during travel of the arm around and over the limb, and thereafter opening downwardly responsive to said half-turn of the handle whereby to first carry the loop of the rope over the top of the limb and then free it to fall out of engagement with the supporting means; and
    (d) means on the handle for engaging the loop after the rope has been positioned over the top of the limb and the loop has been disengaged from said means, whereby the loop may be made accessible to a user for passage of the other end of the rope through the loop and drawing of the rope tightly against the limb.

2. A device as in claim 1 wherein said arm is curved through substantially 180 degrees to provide said recess.

3. A device as in claim 2 wherein the arm is formed of a length of rod material.

4. A device as in claim 1 wherein said first named means comprises a generally U-shaped yoke.

5. A device as in claim 4 wherein the arm has a proximal end fixedly secured to the handle, and a distal end on which said yoke is provided.

6. A device for attaching to the limb of a tree a rope having a loop at one end, comprising:
    (a) an elongated handle;
    (b) an arm extending laterally outwardly from said handle and curved so as to travel around the side and over the top of said limb responsive to rotation of the handle about its longitudinal axis;
    (c) means on said arm for supporting the looped end of the rope during travel of the arm around and over the limb whereby to carry the loop of the rope over the top of the limb; and
    (d) means on the handle for engaging the loop after the rope has been positioned over the top of the limb, whereby the loop may be made accessible to a user for passage of the other end of the rope through the loop and drawing of the rope tightly against the limb, said first named means comprising a generally U-shaped yoke, the arm having a proximal end fixedly secured to the handle, and a distal end on which said yoke is provided, the arm being curved through substantially 180 degrees and lying in a plane substantially normal to the length of the handle.

7. A device as in claim 6 wherein said yoke is inclined outwardly from said plane.

8. A device as in claim 5 wherein the second named means comprises a finger extending laterally from the handle oppositely to the direction in which the arm extends therefrom.

9. A device as in claim 8 wherein said finger lies in the plane of the arm.

10. A device as in claim 9 wherein the finger is inclined within said plane out of perpendicularity to the length of the handle.

11. A device as in claim 9 further including a rod-like extension projecting laterally outwardly from the handle, the finger having a proximal end rigidly secured to said extension, said device further including a lug on the proximal end of the finger, whereby the rope may be draped over said lug and extension prior to rotation of the handle for the purpose of passing the rope over the tree limb.

* * * * *